United States Patent [19]
Busta et al.

[11] Patent Number: 6,140,646
[45] Date of Patent: Oct. 31, 2000

[54] DIRECT VIEW INFRARED MEMS STRUCTURE

[75] Inventors: Heinz Hermann Busta, Plainsboro; Robert Amantea, Manalapan, both of N.J.

[73] Assignee: Sarnoff Corporation, Princeton, N.J.

[21] Appl. No.: 09/369,213

[22] Filed: Aug. 5, 1999

Related U.S. Application Data

[60] Provisional application No. 60/112,654, Dec. 17, 1998.

[51] Int. Cl.$^7$ .............................. H01L 27/14; G01J 5/20
[52] U.S. Cl. ................... 250/332; 250/366; 250/320.08; 250/338.1
[58] Field of Search ................ 250/338.4, 332, 250/338.1, 339.01, 339.02, 339.05, 341.3, 370.08, 361 R, 366

[56] References Cited

U.S. PATENT DOCUMENTS

| | | |
|---|---|---|
| 3,415,712 | 12/1968 | Barker, Jr. . |
| 3,896,309 | 7/1975 | Halsor et al. . |
| 4,762,426 | 8/1988 | Foss . |
| 5,013,902 | 5/1991 | Allard .............................. 250/214 VT |
| 5,550,516 | 8/1996 | Burns et al. . |
| 5,844,238 | 12/1998 | Sauer et al. . |
| 5,902,165 | 5/1999 | Levine et al. .............................. 445/24 |

FOREIGN PATENT DOCUMENTS

| | | |
|---|---|---|
| WO 95/02170 | 1/1995 | WIPO . |
| WO 95/02180 | 1/1995 | WIPO . |
| WO 96/08701 | 3/1996 | WIPO . |

OTHER PUBLICATIONS

J. R. Barnes et al., "Photothermal spectroscopy with femtojoule sensitivity using a micromechanical device" *Nature*, vol. 372, pp. 79–81 (Nov. 3, 1994).

P.I. Oden et al. "Optical and Infrared Detection Using Microcantilevers" Department of Physics, University of Tennessee, pp. 1–10 (Apr. 1996).

Chalamala et al., "Fed up with Fat Tubes" *IEEE Spectrum*, pp. 42–51 (Apr. 1998).

Ken Werner "The flowering of flat displays", *IEEE Spectrum*, pp. 40–49 (May 1997).

PCT Search Report, May 30, 2000, PCT 40/930178.

*Primary Examiner*—Constantine Hannaher
*Assistant Examiner*—Albert Gagliardi
*Attorney, Agent, or Firm*—William J. Burke

[57] ABSTRACT

An apparatus and process for forming an infrared imager suitable for night vision surveillance systems. The infrared imager includes an array of field emissive devices formed within a semiconductor substrate such as a silicon wafer. The field emissive devices each include silicon emitters formed within the silicon substrate and a micro-cantilever including a conductive gate plate suspended above the emitters. The micro-cantilever is formed of a bi-material and bends in response to absorbed infrared radiation, locally changing an electric field applied to the structure, and therefore, the emission current of the emitters. Electrons emitted from the emitters form a visible image on a phosphor plate.

68 Claims, 9 Drawing Sheets

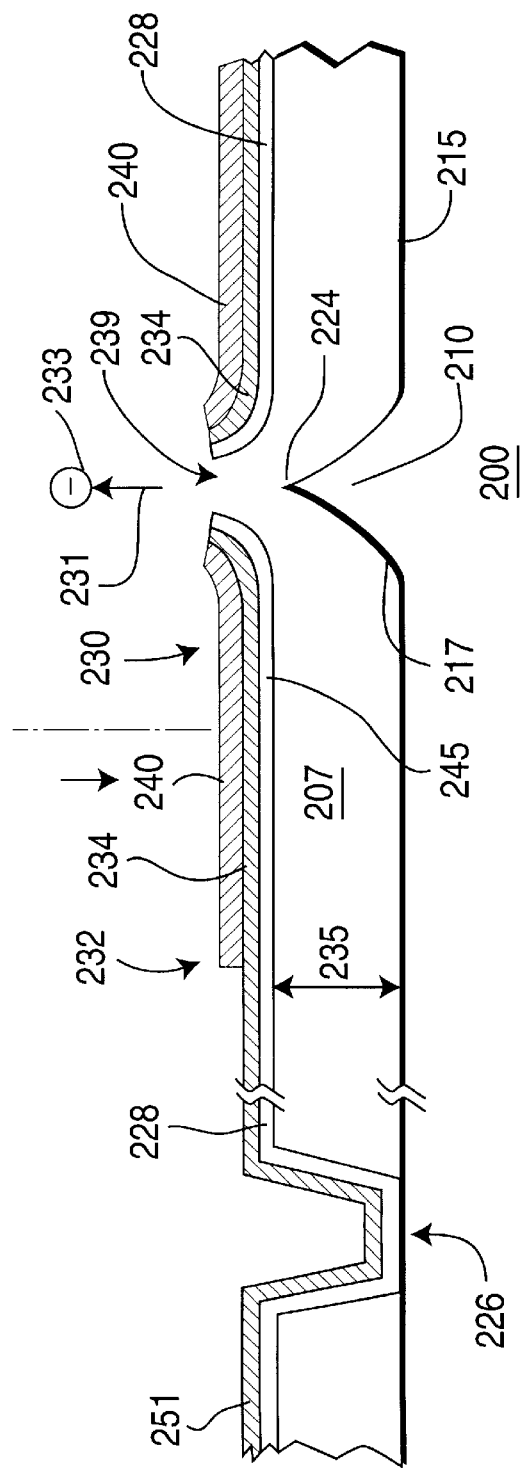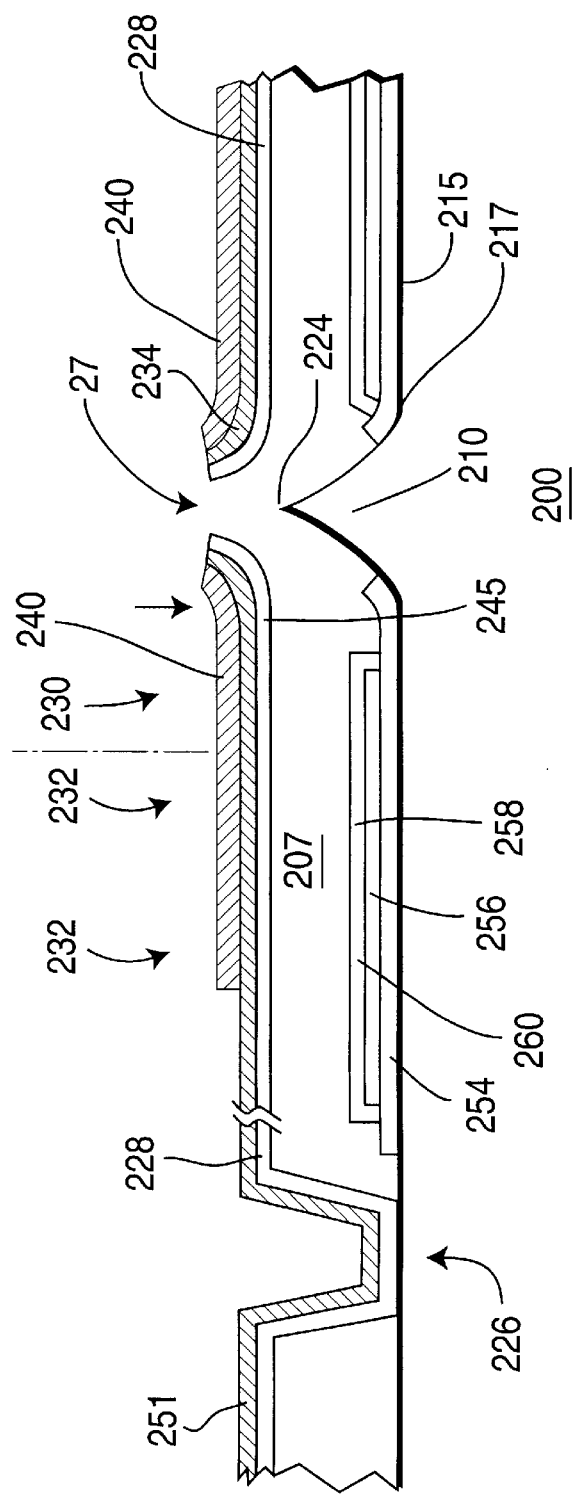

a) TEMPERATURE T1 b) TEMPERATURE T2
T2 > T1

DIRECT VIEW INFRARED MEMS STRUCTURE

RELATED APPLICATIONS

This application claims the benefit of U.S. Provisional application Ser. No. 60/112,654, filed Dec. 17, 1998.

GOVERNMENT SUPPORT

This invention was at least partially supported by the Government Contract No. F30602-98-C-0276. The government may have certain rights in this invention.

FIELD OF THE INVENTION

The present invention relates, most generally, to infrared radiation imaging devices. More particularly, the present invention relates to a micro-electromechanical field emissive device formed within a semiconductor substrate, which converts infrared radiation to visible light. The present invention provides a direct conversion of infrared radiation photons into a visible display without intervening electronics and is suitable for night vision applications.

BACKGROUND OF THE INVENTION

Instruments for the measurement of infrared radiation (IR) are becoming increasingly important for a variety of commercial and non-commercial applications. An example of such an application is a night vision surveillance system. A night vision system is capable of producing a visible image of an object or objects in darkness, based upon the infrared radiation level of the object or objects. Conventional night vision systems, however, have various shortcomings. Existing night vision image intensifiers, for example, cannot operate in total darkness: they generally require low-level ambient light, such as starlight, to convert an infrared radiation image of an object to a visible display. Many conventional night vision systems also require intervening electronics to convert the absorbed infrared radiation to a visible display. Traditional night vision technologies include cryogenically cooled infrared cameras, uncooled infrared cameras, image intensification tubes and low light level, solid-state, charge coupled devices. Charge coupled devices (CCD) are also unable to operate in total darkness. Cryogenically cooled infrared cameras require a costly cryogenic cooling system and while uncooled infrared cameras may ultimately be operable in total darkness, they would still require special packaging, temperature stabilization systems, camera electronics, and a display, each of which adds costs to the night vision system.

The present invention is directed to overcoming the shortcomings of the conventional technology, and the costs associated with the supplemental systems required in the conventional technology, by providing an infrared imager which converts infrared radiation directly to a visible image.

SUMMARY OF THE INVENTION

The present invention embodies both the method and apparatus for converting infrared radiation to a visible display. The present invention provides a micro-electromechanical (MEM) field emissive device formed on a semiconductor substrate. The field emissive device includes several cone-shaped emitters formed-on the semiconductor substrate. Above the emitters, a conductive gate is formed of a bi-material element. The bi-material element forms a micro-cantilever, suspended above the emitters, which micro-cantilever is anchored to the substrate and which bends in response to absorbed infrared radiation. An electric field is applied across the emitters and the conductive gate. The strength of the electric field changes in response to the bending of the conductive gate. In response to the electric field, the emitters produce electrons which travel through openings in the conductive gate and are absorbed on a phosphor plate, producing a visible image. The intensity of electron emission from an emitter varies with the electric field strength existing between the emitters and the conductive gate. Multiple MEM field emissive devices are arranged within an array to form an infrared imager.

Another aspect of the present invention is the process used to produce the field emissive devices within a semiconductor substrate. Still another aspect of the present invention is the method of producing a visible image using the field emissive devices of the present invention.

BRIEF DESCRIPTION OF THE DRAWINGS

FIG. 1 is a cross-sectional view showing a silicon emitter and a bi-material micro-cantilever including a conductive gate plate according to an exemplary embodiment of the present invention;

FIG. 2 is a cross-sectional view showing a silicon emitter and a bi-material micro-cantilever including a gate plate according to an alternative embodiment of the present invention;

FIGS. 4A–D, 4G, and 4I–4O are cross-sectional views

DETAILED DESCRIPTION OF THE INVENTION

Figure 3:
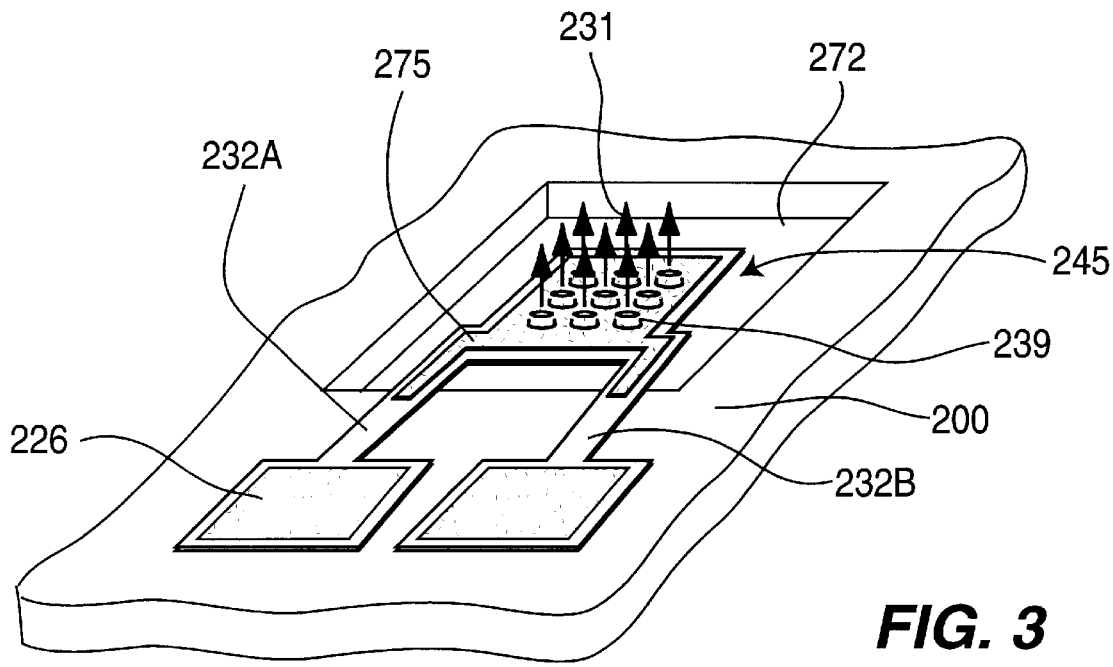
FIG. 3 is a perspective view of another alternative embodiment of the field emissive device.

The present invention provides an infrared imager suitable for use in night vision applications. The invention operates through a direct conversion of infrared photons to a visible display without intervening electronics. The infrared imager includes an array of several field emissive devices which form uncooled bi-material infrared detectors within a semiconductor substrate. Each field emissive device includes multiple emitters formed of the substrate material. Each field emissive device also includes a bi-material micro-cantilever arm formed over the emitters, that moves in response to incident infrared photons which are absorbed by the bi-material element, which is formed of two materials having significantly different coefficients of thermal expansion.

The bi-material element includes a conductive gate plate in the gate region and an electrical potential is applied between the gate plate and the emitters beneath the gate plate. As the bi-material of the micro-cantilever bends in response to absorbed infrared radiation, the local electric field between the gate plate and the emitters changes, which modulates the emission current of the tips. Electrons emitted from the emitter tips (cathode) are directed towards a positively biased phosphor plate (anode) where the impact of electrons is converted into visible light. Thermal isolation between the bi-material gate and the substrate is achieved by a thin silicon carbide or other material which forms part of the micro-cantilever arm extending from the bi-material gate region to the substrate anchor. Silicon carbide is used as an example of the type of material required, however, any hydrogenated amorphous material, such as silicon carbide or silicon nitride can be used. Because the bending of the bi-material gate, in response to incident infrared radiation, changes the amount of light emitted by the phosphor plate, the subject invention acts as a direct view infrared imager.

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity.

FIG. 1 is a cross-sectional view showing an exemplary embodiment of a field emissive device having a micro-cantilever and a single silicon field emitter, according to an exemplary embodiment of the present invention. For matters of brevity and simplicity, only one silicon emitter is shown. It is understood, however, that many silicon emitters are produced in close proximity to one another to form a pixel region of a field emissive device. Each field emissive device includes a micro-cantilever formed of a bendable, bi-material which includes a conductive gate (alternatively referred to as a "gate plate") disposed above the several silicon emitters. The gate plate includes multiple openings, one for each emitter. It is also understood that a multiplicity of field emissive devices are arranged within an array each device forming one pixel to produce the infrared imager of the present invention.

Returning to FIG. 1, emitter 210 is formed within semiconductor substrate 200. In the preferred embodiment, emitter 200 is formed of the material that forms the semiconductor substrate 200. In one exemplary embodiment, silicon emitter 210 is formed by etching into the silicon material that forms semiconductor substrate 200 and, as such, is formed of silicon. Silicon emitter 210 is generally conical in shape having a base 217 and a tip 224 oriented upward. Base surface 215 is generally parallel to the original upper surface of the semiconductor substrate, and extends between the emitter bases 217 of the individual silicon emitters 210. The structure includes gap region 207 forming a spacing between base surface 215 and micro-cantilever 245. The height 235 of spacing 207 may vary, but in the exemplary embodiments, may be in the range of 0.85 micron to 1.0 micron. Micro-cantilever 245 is a deflectable member formed of a bi-material (films 240 and 228) and which includes the conductive gate. One of the bi-material films, upper bi-material film 240, is a conductive film which forms a conductive gate plate in gate region 230 over the emitters. The bendable bi-material arm is thermally isolated from, and anchored to, substrate 200.

Generally speaking, the bendable bi-material micro-cantilever 245 includes a gate region 230 over the emitters 210 which includes a conductive gate plate, and a region 232 which includes the bi-material films and is not positioned over the emitters. Region 232 serves as an arm connecting the gate region 230 to the substrate 200 through anchor 226. It can be understood that (in the cross-sectional view shown) there may not be a sharp delineation between regions 232 and 230, both of which include the bi-material films, one of which (upper bi-material film 240) is a conductive film. It should be pointed out that region 232 is not drawn to scale. The vertical features shown in FIG. 1 have been expanded for clarity. As such, the lateral spacing between the emitter 210 and anchor 226 (the region traversed by arm region 232) may be considerably greater than suggested in FIG. 1.

Anchor 226 provides support for micro-cantilever 245 by connecting micro-cantilever 245 to substrate 200. In an exemplary embodiment, a silicon carbide film serves as lower bi-material film 228 and also provides electrical and thermal isolation between the gate region 230 of micro-cantilever 245, and substrate 200. In the exemplary embodiment, a titanium tungsten (TiW) film 234 covers lower bi-material film 228 and serves a dual function of an infrared radiation absorption material in the gate region 230, as well as providing an electrical interconnect to other field emissive devices (not shown) in region 251. In alternative embodiments, suitable films other than TiW may be used. Also in alternative embodiments, a separately formed infrared absorber material may not be required or the infrared absorber material may be formed of a different film, with still another material serving as an electrical interconnect. In another alternative embodiment, lower bi-material film 228 may be formed of a film other than silicon carbide, such as silicon nitride.

It can be seen that an opening 239 is formed in the micro-cantilever 245 above silicon emitter 210. It should be understood that FIG. 1 is a cross-section taken through silicon emitter 210. As such, although it appears that gate region 230 of micro-cantilever 245 is discontinuous in the cross-sectional view shown in FIG. 1, it should be understood, however, that, for cross-sectional views taken between the silicon field emissive devices, micro-cantilever 245 is a continuous structure. This is shown in the top-view and perspective view FIGS. 3, 4E, 4F and 4H below. When an electric potential is applied between silicon emitter 210 and the conductive gate plate formed of conductive upper bi-material film 240 in gate region 230, an electric field is formed which causes silicon emitter 210 to emit electrons 233 represented hereinafter by arrows 231, with an intensity determined by the strength of the electric field, along the direction of arrow 231, and through the opening 239 formed in the conductive gate plate, and through films 228, 234, and 240.

FIG. 2 is a cross-sectional view showing another exemplary embodiment of the bendable, bi-material conductive gate of the present invention. In this alternative embodiment, a gate shield 260 is included along base surface 215 between individual silicon emitters 210. Gate shield 260 includes a conductive gate shield material 256 formed between two protective films 254 and 258. In the exemplary embodiment shown, the upper 258 and lower 254 protective films are silicon carbide films, but other films such as silicon nitride may be used alternatively. In another exemplary embodiment (not shown), upper protective film 258 may not be used. Also in the exemplary embodiment, gate shield material 256 may be tin oxide or indium tin oxide, but it is contemplated that other films which are both conductive and relatively transparent to IR radiation such as doped polycrystalline silicon, may be used as the gate shield material alternatively.

FIG. 3 is a perspective view of an alternative embodiment of a field emissive device including nine emitters. The number of emitters which constitute a pixel region of a field emissive device may vary from 10 to 200 in various embodiments. In the exemplary embodiment, the nine emitters (not shown) which make-up the pixel region are formed beneath the nine corresponding holes 239 which are formed in bendable bi-material, conductive gate 275. Bendable conductive gate 275 forms part of a micro-cantilever 245 attached to substrate 200 by means of a pair of anchors 226. A pair of arms 232A, 232B connect the conductive gate 275 to substrate 200 by way of anchors 226. Alternative embodiments may include a single arm, or three or more arms to provide connection. In various exemplary embodiments, the arm dimensions may vary from 3 to 6 microns wide, and 40 to 400 microns in length. For mechanical stability, the length may lie within the range of 50 to 100 microns in the exemplary embodiment. In the alternative embodiment shown in FIG. 3, the field emissive device is formed within a trench region 272 formed in the semiconductor substrate 200. In the exemplary embodiment, the trench region 272 may be 10 microns deep. FIG. 3 shows emitted electrons represented by arrows 231 directed upward and through the openings 239 in the bi-material gate plate 275.

PROCESS OF FORMATION

Figure 4A:
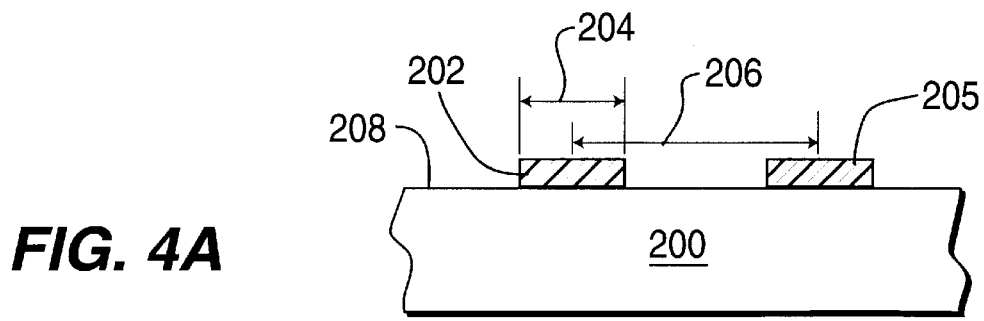
FIGS. 4A through 4O show the processing steps for the formation of a field emissive device according to the present invention.
Figure 4B:
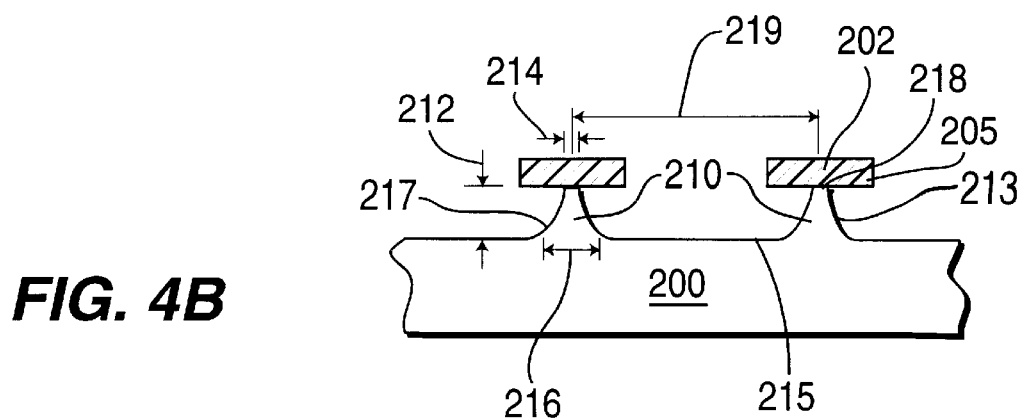
Figure 4C:
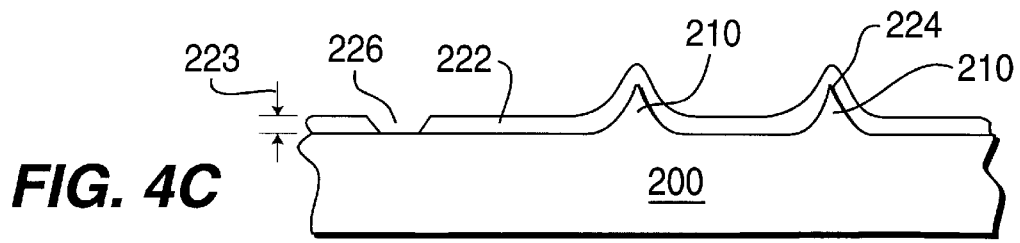
Figure 4D:
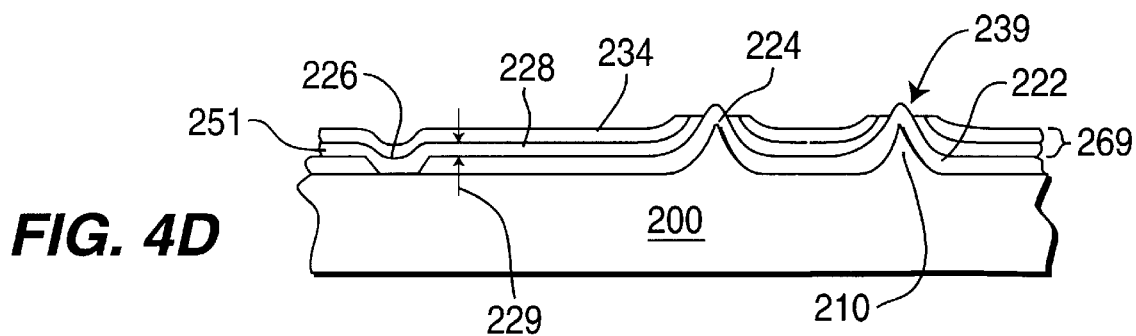
Figure 4E:
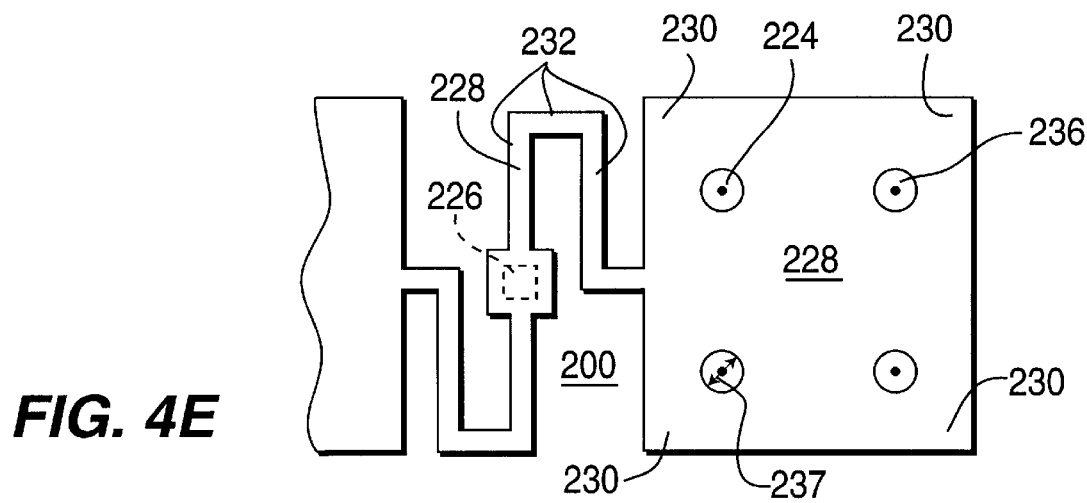
FIGS. 4E, 4F, and 4H are top views.
Figure 4F:
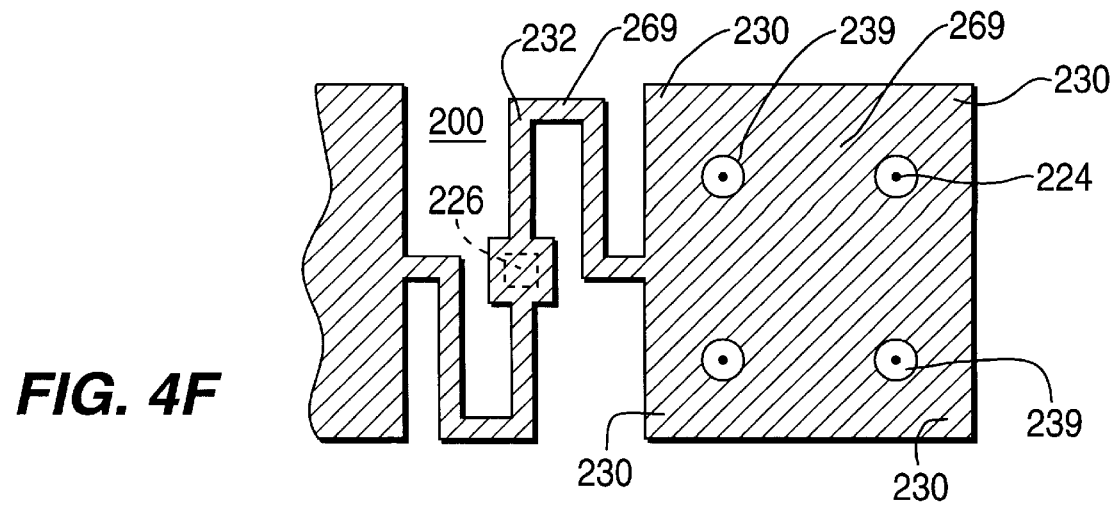
Figure 4G:
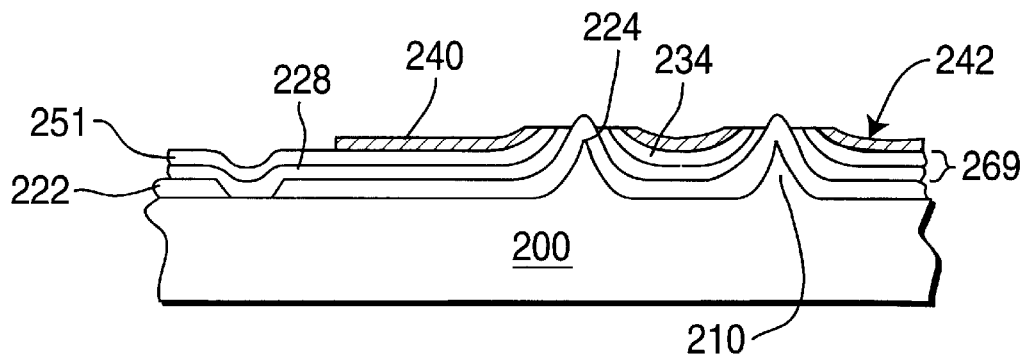
Figure 4H:
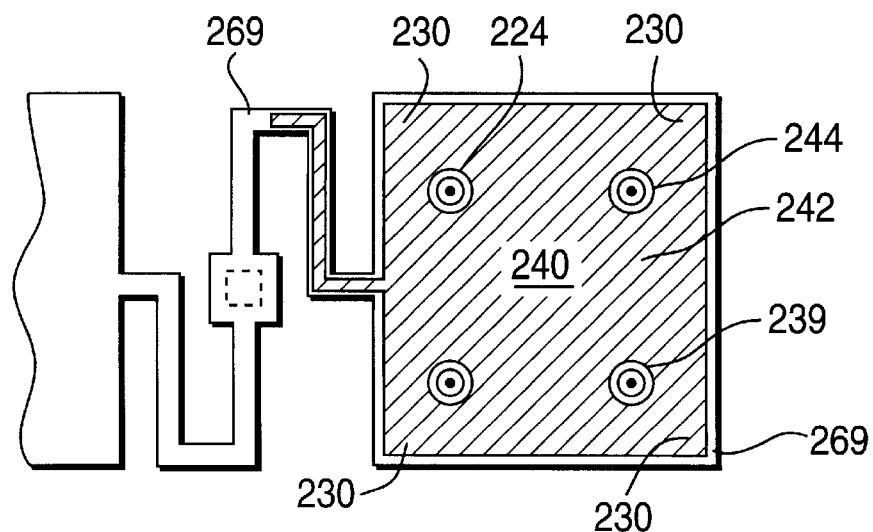
Figure 4I:
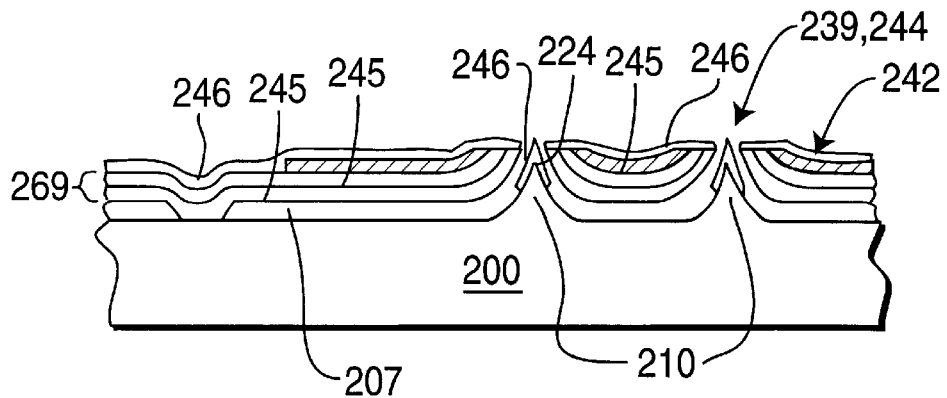
Figure 4J:
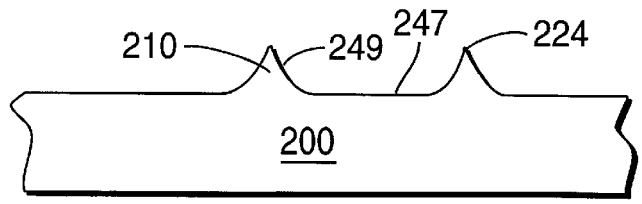
Figure 4K:
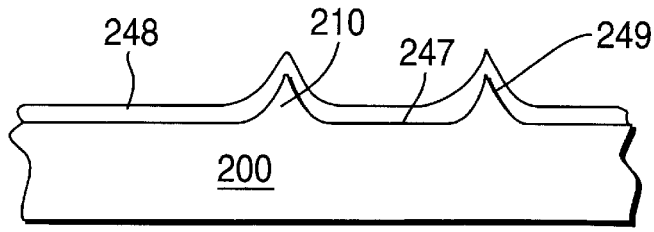
Figure 4L:
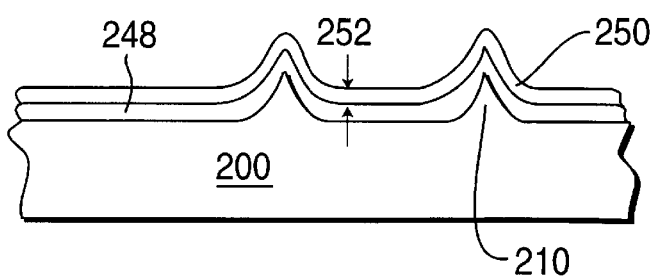
Figure 4M:
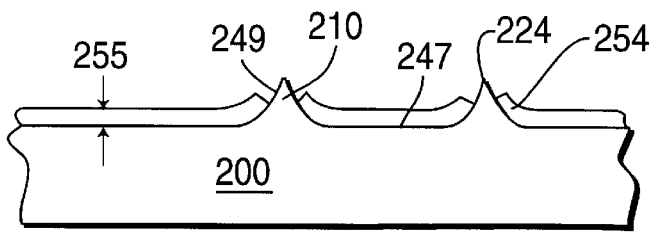
Figure 4N:
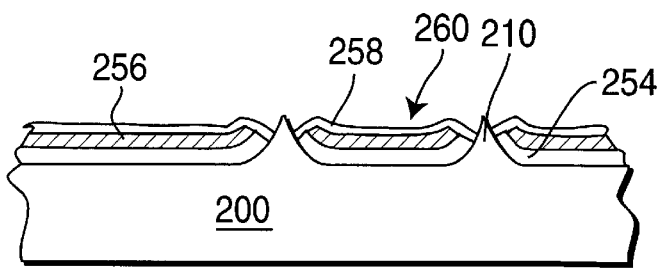
Figure 4O:
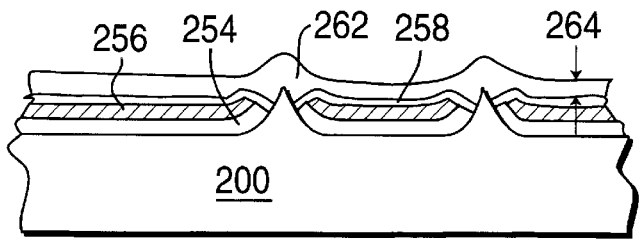

FIGS. 4A–4O show the process sequences used to form various exemplary embodiments of the present invention.

First Exemplary Embodiment

The first step in the formation of an MEM field emissive device IR detector is to choose a suitable semiconductor substrate. In the exemplary embodiment, a silicon wafer commonly used in the semiconductor manufacturing industry may be used. In alternative embodiments, other suitable substrate materials may be used. The semiconductor substrate is chosen to be an easily etchable material, and a material which is transmissive to infrared radiation. The semiconductor substrate includes an upper surface on which the emitter devices of the present invention are fabricated. The opposed, lower surface of the semiconductor substrate may be polished and/or coated with an anti-reflective coating in the preferred embodiment. The polishing and coating operations enhance transmission of incident infrared radiation. Using the silicon substrate as in a first exemplary embodiment, silicon emitters are formed according to the following process. Referring to FIG. 4A, a pattern is formed of a masking material 202 on upper surface 208 of silicon substrate 200. In the exemplary embodiment, the silicon substrate 200 may be an n-type substrate. In the preferred embodiment, photosensitive materials such as photoresists commonly used in the semiconductor manufacturing industry may be used as masking material 202 to form dots 205. In the exemplary embodiment, circular dots 205 having a diameter 204 of approximately 6 microns are formed in close proximity to one another within a region defining a pixel region. In an exemplary embodiment, the spacing 206 between the center of adjacent dots 205 may be 8 to 10 microns. In the exemplary embodiment, 10–200 generally circular dots 205 are formed in close proximity to one another to form a pixel region.

The process for forming a pattern within a masking material may be as according to the following conventional techniques. First a masking material is formed as a thin film over the level to be patterned. In an exemplary embodiment, a viscous photosensitive material may be spin-coated onto the substrate to form a thin film. The thin film of photosensitive material is then exposed to a light source in predetermined regions which are not blocked by an opaque masking material formed on a mask placed between the light source and the photosensitive film.

The photosensitive material in the exposed region is converted by the light, into materials which are dissolvable in a developer. A developer is then used to develop away the dissolvable sections, thereby forming the pattern in the masking material. In another exemplary embodiment, direct-write e-beam lithography techniques may be used to form a pattern within a masking material. The pattern formed in the masking material is then translated to the underlying level which it masks, by removing sections of the underlying level which are not covered by the masking material, generally by conventional etching techniques which selectively remove the layer being etched. The masking material is then removed.

For purposes of brevity, the above details of the conventional techniques for patterning a layer within a semiconductor device such as the field emissive device described herein, will not be included in conjunction with each patterning level. Rather, it should be understood that when a level or film is "patterned", it is done so according to the foregoing general description.

Now turning to FIG. 4B, after the pattern of dots is formed, an isotropic etching process is then carried out. The isotropic etching process may be done using dry chemical or wet chemical etching techniques. In an exemplary embodiment, the isotropic etch process may use a plasma etcher having $CF_4/O_2$ as the etch gases, but other processes for isotropically etching the substrate, may be used alternatively. The isotropic etch etches substrate material 200 and undercuts dots 205 formed of masking material 202. The etch time is chosen so that generally conical emitters 210 are formed of the substrate material 200 beneath dots 205. The conical emitters 210 have a generally tapered section 213 oriented upward. In the exemplary embodiment, the emitters 210 may be formed having a height 212 (alternatively stated, an etching depth 212) of approximately 1 to 3 microns. In the preferred embodiment, emitter height 212 may be about 2 microns. The diameter 216 of the circular base 217 of an emitter 210 may range from 2 to 5 microns and may be approximately 5 microns in the exemplary embodiment. Base surface 215 is generally parallel to original substrate surface 208 shown in FIG. 4A.

The generally conical field emitters 210 include a plateau 218 forming a top surface. This plateau 218 has a diameter 214 of approximately 0.2 micron in an exemplary embodiment. The etching process is stopped when plateaus having a diameter 214 within the range of 0.2 to 0.5 micron, are achieved. The spacing 219 between emitters 210 may differ in various embodiments, but they may be spaced apart by 10 microns in the preferred embodiment. After formation of the conical emitters 210, masking material 202 is then removed and the substrate cleaned, using conventional methods.

The substrate is then oxidized within a steam environment to form a thermal oxide film 222 as shown in FIG. 4C. In the exemplary embodiment, the thermal oxidation process may be carried out using a temperature of approximately 1000° C. but other temperatures may be used alternatively. In the exemplary embodiment, thermal oxide film 222 will be formed to a thickness 223 of approximately 0.85 micron, but may vary in other embodiments between 0.5 micron and 2.0 microns. Approximately half of the film thickness is formed by consuming surface silicon and extending down into the exposed silicon surface (original silicon surface 213 and 215 as shown in FIG. 4B). Through this method of formation of the oxide film at the expense of the original silicon surface 213 and 215 as shown in FIG. 4B, the silicon emitters 210 are sharpened by the steam oxidation process. The originally formed plateau-like top surface 218 of the silicon emitters 210 is substantially converted to tip 224. In addition to sharpening tips 224 of the individual silicon emitters 210, the thermal oxide 222 film serves as a release layer within the pixel region. As described below in conjunction with subsequent figures, after the bi-material conductive gate is formed above the pixel region and over the release layer, the oxide release layer is subsequently removed producing the anchored micro-cantilevered structure including the bi-material conductive gate.

Still referring to FIG. 4C, vias or openings 226 are then formed through oxide film 222 after oxide film 222 is formed. The vias or openings 226 may be formed using conventional patterning and etching techniques, as common in the art. The vias contact silicon substrate 200 in regions adjacent to the pixel region. Vias 226 serve as anchor sites for the micro-cantilevers to be formed. In an exemplary embodiment, via 226 may have lateral dimensions ranging from 2 microns×2 microns, to 6 microns×6 microns.

Now referring to FIG. 4D, after the anchor vias 226 are formed, a lower bi-material film 228 is formed on the substrate. In the exemplary embodiment, approximately 3000 angstroms of amorphous hydrogenated silicon carbide is formed as lower bi-material film 228. The lower bi-material film 228 serves as the anchor material connecting the micro-cantilever to the substrate, a thermal isolation material, an electrical insulator and also as one of the (lower) bi-material films. Although a silicon carbide film referred to hereinafter, is used in a first exemplary embodiment, other suitable films such as silicon nitride, may be used alternatively. In an alternative embodiment, lower bi-material film 228 may be formed of a thickness 229 ranging from 2500 to 10,000 angstroms. The two films which combine to form the bi-material element, are chosen because of their respectively mismatched coefficients of thermal expansion. In an exemplary embodiment silicon carbide film 228 serves as an infrared absorber material.

In an exemplary embodiment, the silicon carbide film 228 may be patterned after deposition as shown in top-view shown in FIG. 4E. Any suitable patterning technique common in the industry, may be used to form a pattern of gate region 230 that is connected to substrate 200 by means of arm 232 and anchor 226. In an exemplary embodiment, the silicon carbide film 228 may be dry etched using $CF_4/O_2$ as etch gases. Silicon carbide film 228 serves as one of the bi-material films in regions where the upper bi-material film is formed above it, and also as a thermal and electrical isolation feature in the arm region 232 and anchor region 226. Gate openings 236 are formed in the gate region 230 through silicon carbide film 228 directly over the tips 224 of the underlying emitters (not shown). In an exemplary embodiment, gate holes 236 may have a diameter 237 ranging from 0.3 to 1.5 microns. In a first exemplary embodiment where a film serving both as an infrared absorber material and an interconnection film, is formed directly over the silicon carbide film to form a composite film, the silicon carbide film 228 is patterned as part of the composite film.

Returning to FIG. 4D, in the first exemplary embodiment, a film 234 having the qualities of a conductive material and an infrared absorber material is formed over silicon carbide film 228 prior to patterning the silicon carbide film, thereby forming a composite film 269 including film 234 formed over silicon carbide film 228. In exemplary embodiments, films such as platinum or TiW may be used. In an exemplary embodiment, a TiW film may be used having a thickness on the order of 100 angstroms, but the thickness may vary from 100–400 angstroms in alternative embodiments. In the region over the emitters 210, TiW film 234 serves as an infrared radiation absorber material. This allows the incident infrared radiation to be absorbed by the bi-material microcantilever. From region 251, TiW film 234 extends laterally to provide electrical connection to the other field emissive devices (not shown).

In a second exemplary embodiment, the silicon carbide film 228 serves as an infrared absorber material and a separate film (such as film 234) is not needed to serve as a separate infrared absorber material. A TiW film or some other conductive film may serve only to connect the field emissive devices to one another through region 251 since the silicon carbide, lower bi-material film is an electrical insulator. In an alternative embodiment, the TiW film may be formed over the silicon carbide film after the silicon carbide film has been patterned. In other alternative embodiments, the TiW film or other conductive film may serve only to connect the field emissive devices to one another and a separate film (not shown) may be formed over gate region 230 shown in FIG. 4E to serve as an infrared absorber material.

As described above, in the sections of arm 232 (as shown in FIG. 4E) which are not subsequently covered by the conductive bi-material film (not shown), the silicon carbide film 228 serves as a thermal isolation feature which forms the anchor 226 and at least part of the arm 232 (FIG. 4E) connecting the bi-material gate region 230 to the anchor 226. In anchor region 226, silicon carbide film 228 physically connects the micro-cantilever to the substrate 200.

Returning to the first exemplary embodiment, after the silicon carbide/TiW composite film 234/228 (hereinafter referred to as composite film 269) is formed, composite film 269 is patterned by forming a pattern in a masking film (not shown) formed over composite film 269, then sequentially etching the TiW (234), then silicon carbide (228) films. In an exemplary embodiment, a commercially available etchant— EDTA—is used to wet etch TiW film 234, and the silicon carbide film may be etched as described above. Openings 239 are formed through both the TiW film 234 and the silicon carbide film 228 which form composite film 269 above the locations of the silicon emitter tips 224, as shown in the top-view shown in FIG. 4F. In an exemplary embodiment, openings 239 may be 0.3–1.5 microns in diameter. FIG. 4F is a top-view of the gate structure 230 including silicon carbide film 228 formed beneath titanium tungsten film 234 to form composite film 269 including openings formed over the emitter tips 224.

In yet another exemplary embodiment, after the TiW or other conductive film is formed and patterned as part of a composite film as described above, another infrared absorber material (not shown) may be formed over the patterned composite film. After the film is formed, conventional patterning methods are used to remove the material from regions other than gate region 230 (as in FIG. 4F), and to simultaneously form openings in the absorber material over openings 239 in composite film.

Now turning to FIG. 4G, an upper bi-material film 240 is formed over the exemplary structure shown in FIGS. 4D and 4F. In the first exemplary embodiment, upper bi-material film 240 is formed over patterned composite film 269, as shown in FIG. 4G. In another exemplary embodiment not including an infrared absorber film, upper bi-material film 240 may be formed directly over silicon carbide film 228. In an exemplary embodiment, upper bi-material film 240 is a metallic film which serves as the conductive gate to which an electric potential may be applied. In the first exemplary embodiment, gold (Au) may be used because of its suitably mismatched coefficient of thermal expansion with that of silicon carbide. In to alternative embodiments, other films such as Aluminum (Al) may be used to form the bi-material conductive gate. The metallic film, in the exemplary embodiment, may be formed to a thickness of 3000 angstroms, but other thicknesses may be used alternatively. In an exemplary embodiment wherein a TiW film is formed over the first bi-material, silicon carbide film, a thin (50–100 angstrom) film of Chromium (Cr) is (not shown) may be formed prior to the upper bi-material gold film to insure good adhesion between the gold film and the TiW film.

As shown in the top-view in FIG. 4H, after deposition, metal film 240 is patterned to form a conductive gate plate 242 in the gate region 230, over the pixel region. In the first exemplary embodiment, the Au film may be patterned by forming a pattern in a photosensitive film formed on the Au film, then etching the Au film. The Au film may be etched using a wet etch chemistry such as potassium iodine/iodide, or using a cyanide such as ferric cyanide. The Au film may alternatively be dry etched using ion milling or ion beam sputtering techniques. The patterned metal film 240 includes openings 244 disposed over and corresponding to the openings previously formed in the underlying film or films located over the silicon emitter tips 224. In an exemplary embodiment, openings 244 may be concentrically formed over corresponding openings 239 formed in composite film 269, and will be sized slightly larger then subjacent openings 239.

As above, the bi-material films (e.g. SiC, Al and Au) are chosen to have significantly different coefficients of thermal expansion. In this manner, when infrared radiation is absorbed by the gate structure, the micro-cantilevered bi-material film bends. For example, the coefficient of thermal expansion, which may be expressed in terms of parts per million of expansion per degree Centigrade (PPM/° C.), may be 4 PPM/° C. for silicon carbide, 14 PPM/° C. for Au and 23 PPM/° C. for Al. The lower bi-material film is also chosen to have a suitably high resistance to thermal conductivity.

Following the formation of the bi-material conductive gate, a micro-cantilever structure is formed by chemically removing the oxide release layer (film 222 as in FIG. 4G) from beneath the bi-material conductive gate. In an exemplary embodiment, a buffered hydrofluoric acid (BHF) solution may be used. In alternative embodiments, ethylene glycol may be additionally included. After the release layer has been chemically removed, the field emissive device is rinsed in methanol and dried using supercritical $CO_2$. This insures that the device is completely dried. After drying, the micro-cantilever structure includes a conductive gate plate suspended over the emitters which form the pixel region, and anchored to the substrate in an adjacent region. The bi-material conductive gate plate is free to move up and down and is thermally isolated from the substrate. A cross-sectional view of an exemplary embodiment of the completed micro-cantilever is shown in FIG. 1.

After the release layer has been chemically removed, the field emissive device, or, as in the exemplary embodiment, the array of field emissive devices, is adapted for assembly with the other components to form the infrared imager of the present invention.

The emitters are protrusions formed by etching into the silicon substrate. As such, the emitters may be electrically connected to the cathode potential by connecting an electric circuit capable of supplying the cathode potential, to the substrate. Conventional techniques may be used to form a wiring pattern on the substrate to connect the conductive gate plate formed over the emitters, to an electric circuit capable of biasing the conductive gate plate at a gate potential. In an exemplary embodiment, the TiW interconnection film used to connect the field emissive devices to one another, may additionally be used to electrically connect the field emissive devices to the electrical circuit. In this manner, circuitry which provides an electrical field between the emitters and the conductive gate may be connected to the field emissive devices of the present invention.

Second Exemplary Embodiment

In alternative embodiments, the silicon emitters may be coated with boron nitride (BN) film to lower the turn-on voltage of the emitters. In the preferred embodiment, boron nitride is deposited at a temperature of 450° C. using sputter deposition techniques. Also in the alternative exemplary embodiment, the thickness of the boron nitride film may be approximately 400 angstroms, but other suitable thicknesses may be used in alternative embodiments. In an exemplary embodiment of the formation process as shown in FIG. 4I, the boron nitride film 246 may be formed after the release layer has been removed and the micro-cantilever 245 has been formed over void area 207. Boron nitride film 246 is deposited onto the substrate including silicon emitters 210 through the openings 244 and 239 formed respectively through films 240 and 269 and directly above the emitters 210 in gate region 230.

Third Exemplary Embodiment

In another exemplary embodiment, the emitters may be coated with the boron nitride film according to the following process. After the thermal oxide release layer is formed (as shown in FIG. 4C) the thermally formed oxide film 222 may be removed using conventional techniques. Now, referring to FIG. 4J, exposed silicon surface 247 includes exposed silicon surfaces 249 of emitters 210 which have been sharpened by the steam oxidation process carried out previously and already include tips 224.

Referring to FIG. 4K, boron nitride film 248 is then introduced onto the substrate surface 247 including over the surface 249 of the sharpened emitters 210. After the boron nitride film is 248 deposited as above, a release layer 250 of oxide is re-formed, as shown in FIG. 4L. The re-formed release layer 250 is typically a low temperature chemical vapor deposition (CVD) oxide film formed at a temperature of approximately 300° C. to 350° C. Thickness 252 of the re-formed release layer 250 may be on the order of 0.85 micron to 1.0 micron.

The re-formed oxide release layer 250 undergoes the same subsequent processing as does the originally-formed release layer as in the first embodiment. That is, anchor holes are formed through this oxide film 250 to provide the anchor site for the micro-cantilever, and the oxide film is ultimately released by a chemical process after the bi-material conductive gate structure is formed above it. When the release layer oxide film is formed using CVD techniques, ethylene glycol may be added to the buffered HF used to chemically remove the release layer according to the preferred removal method.

Fourth Exemplary Embodiment

In another alternative embodiment, a gate shield feature may be added to the device to prevent pull-in. If a boron nitride film (as above) is used, the gate shield feature may not be needed since the device operates before the gate pulls-in. The gate shield feature is used to avoid "pull-in" of the conductive gate, depending on the turn-on voltage that is appropriate for the field emitters. In the exemplary embodiment employing the gate shield feature, the gate shield feature is added to the device after the silicon emitters have been formed and sharpened by the steam oxidation process and prior to the formation of the bi-material films which form the micro-cantilever. After the original thermal oxide release layer is formed, it is removed by conventional oxide removal methods. Following removal of the oxide film, the device is as shown and described in conjunction with FIG. 4J.

Referring to FIG. 4M, a silicon carbide film is formed as base layer 254 on base surface 247 between the silicon emitters 210 and over surface 249 of silicon emitters 210. In an exemplary embodiment, thickness 255 of silicon carbide base layer 254 may be within the range of 2000 to 3000 angstroms. A conventional patterning and etching sequence is used to remove the silicon carbide base layer 254 from the surface 249 near the tips 224 of the silicon emitters 210.

Next, as shown in FIG. 4N, a 200–400 angstrom thick gate shield film 256 is formed over silicon carbide layer base layer 254 and the emitters 210. The gate shield film 256 is than patterned and removed from over the emitters 210. The pattern formed in gate shield film 256 includes an interconnect feature extending laterally from the pixel region (not shown) which may provide connection to an electrical circuit for biasing the gate shield film. In the exemplary embodiment, the gate shield film may be indium tin oxide, but other films such as tin oxide, chromium, or 100 to 1000 angstroms of doped polycrystalline silicon may be used alternatively. A thin (less than 2000 angstroms) silicon carbide film 258 is then formed as cover layer 258 over the gate shield layer, thereby covering the gate shield film 256 within the pixel region. The second silicon carbide cover layer 258 is then selectively removed from over emitters 210 using conventional techniques, thereby producing the gate shield structure 260. Films 254 and 258 are protective films which isolate the gate shield film 256 from the substrate below and from subsequent processing being carried out above the film. In alternative embodiments, a silicon nitride film may be used instead of silicon carbide as protective films 254 and 258 formed beneath and above gate shield layer 256, respectively. In yet another exemplary embodiment (not shown) the second silicon carbide cover layer 258 is not used. By maintaining the thickness of the indium tin oxide, or tin oxide layer below 500 angstroms, no significant infrared transmission loss due to free electron scattering is produced. As such, the gate shield 260 is transparent to infrared radiation.

In the alternative embodiment utilizing the gate shield feature 260, an oxide layer is then re-formed over the field emitters 210 and the gate shield device 260. The re-formed oxide layer which forms the release layer 262 in the pixel region, is formed over the gate shield structure 260 and emitters 210 as shown in FIG. 4O. The re-formed oxide release layer 262 may be formed by spin-on techniques, or CVD techniques. In the preferred embodiment, the film thickness 264 may be within the range of 0.85 to 1 micron thick. Re-formed oxide release layer 262 undergoes the same subsequent processing as described in conjunction with the re-formed oxide release according to the third exemplary embodiment.

The field emissive device formed according to the process described in conjunction with FIGS. 4A through 4O includes a number of silicon emitters formed simultaneously within a pixel region. A field emissive device may be included in an array of field emissive devices formed simultaneously, in the preferred embodiment. According to one preferred embodiment, the "x-y" array may be a 320×240 array. In an exemplary embodiment, the 320×240 array may be formed on a chip having a size of approximately 2 centimeters by 2 centimeters.

The field emissive device formed within the semiconductor substrate is then assembled. A phosphor plate is arranged generally parallel to the upper surface of the semiconductor substrate. In the exemplary embodiment, the phosphor plate is spaced approximately 1000 microns above the upper surface but other spacing may be used. In an exemplary embodiment, the phosphor plate is vacuum-sealed to the chip of the semiconductor substrate. The vacuum between the emitters to phosphors is desirable for proper operation of the field emissive devices. The phosphor plate is connected to an electric circuit which is capable of electrically biasing the phosphor plate.

METHOD OF OPERATION

Figure 5:
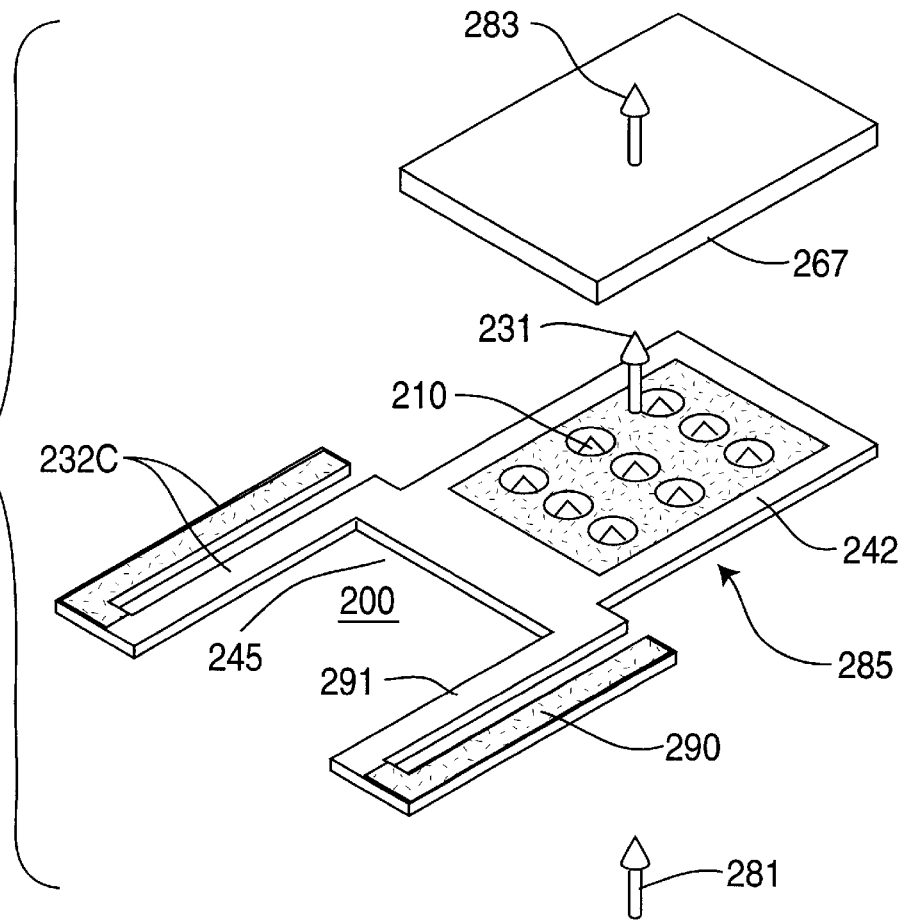
FIG. 5 is a perspective view which is useful for describing the method of operation of the field emissive device.

FIG. 5 is a perspective view of the field emissive device during operation. The infrared imager using the field emissive device 285 is operated when infrared radiation (arrow 281) is incident upon the bottom surface (not shown) of the semiconductor chip formed of substrate 200. An electric potential is applied between the conductive gate plate 242 and the group of emitter cones 210 forming the pixel region. A positive electrical bias is applied to the phosphor plate 267 which accelerates any electrons (arrows 231) emitted by the emitters 210 toward the phosphor plate 267 causing the electrons (arrows 231) to excite the phosphors causing them to emit light. The infrared radiation 281 travels through the IR-transmissive substrate material and the field emissive devices 285. The incident IR radiation 281 is absorbed by the gate plate 242. This increases the temperature of the bi-material element in the gate plate 242 which causes the micro-cantilever 245 including gate plate 242, to deflect. The gate plate 242 is thermally isolated by a silicon carbide section 290 of arm 232C, which is anchored to substrate 200. As such, it is desensitized to any temperature effects building up in substrate 200 which may act as a heat sink. As the gate plate 242 bends, the local electric field between the conductive gate 242 and the emitters 210, varies. Thus, the concept of field modulation is achieved due to the movement of the IR activated gate relative to the tips of the emitters 210.

Figure 6:
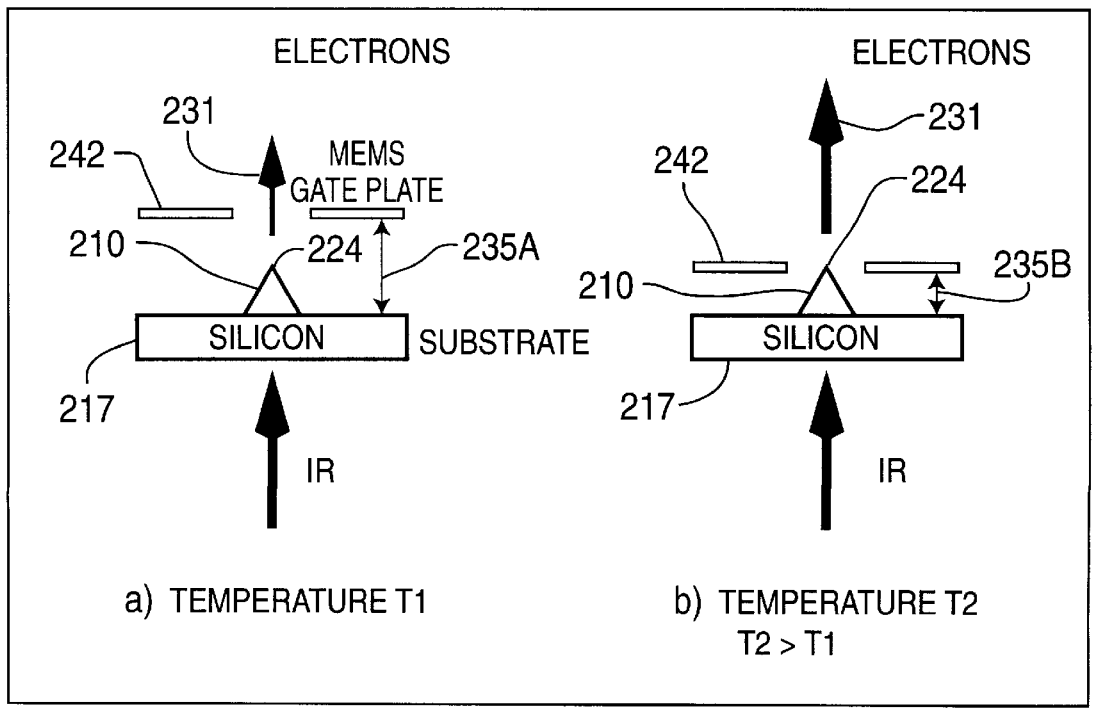
FIG. 6 is a cross-sectional schematic diagram showing the concept of field modulation due to the movement of the gate plate of the field emissive device.

As shown in FIG. 6, as absorbed infrared radiation, or temperature, is increased, the conductive gate plate 242 bends down increasing the field strength of the electric field between the conductive gate plate 242 and the conical emitter 210. It can be seen that distance 235A between gate plate 242 and base 217 of emitter 210, as shown in FIG. 6A is greater than corresponding distance 235B achieved at an increased temperature and as shown in FIG. 6B. For a given voltage applied across the emitters and the conductive gate, the electrical field strength increases as distance (235A or 235B) decreases. An increased electric field strength causes a greater number of electrons (arrows 231) to be emitted from the emitter tips 224. At least some of the emitted electrons (arrows 231) travel through the openings in the gate plate 242 and are directed towards the phosphor plate (not shown) in response to the positive anode potential applied to the phosphor plate.

Returning now to FIG. 5, it can be seen that the emitted electrons (arrows 231) travel to the positively biased phosphor plate 267 where they are absorbed and converted to visible light 283. In an exemplary embodiment the phosphor plate 267 may be formed of yttrium aluminum garnet ($Y_3AlGa_5O_{12}$-Tb), commonly referred to as industry standard P-53, a green phosphor, but other phosphor materials such as zinc oxide may be used alternatively. The changing electric field strength between the gate plate 242 and the emitters 210 changes the number of emitted electrons and thus the beam current that is applied to the phosphor plate 267. In this manner, the intensity of visible light 283 varies directly with the infrared radiation absorbed, and a visible image is created.

Electrical circuitry common in the art (not shown) is used to apply respective potentials between the conductive gate plate 242 and the emitters 210 to produce the electric field. Another electrical circuit (not shown) is also used to provide the positive electrical bias to the phosphor plate 267, enabling the phosphor plate 267 to accelerate the emitted electrons (arrows 231), and to produce visible light 283 when the electrons (arrows 231) strike phosphor plate 267. The positive bias applied to the phosphor plate will vary depending on the phosphor material used. In an exemplary embodiment, a bias of 2000–5000 volts may be applied to the phosphor plate. The turn-on voltage required to be supplied between the conductive gate 242 and the emitters 210, may be on the order of 50–150 volts. Emission currents of 0.1 micro ampere per single tip are typical. In an exemplary embodiment, the turn-on voltage may be lowered to a range of 20 to 60 volts by forming a boron nitride (not shown) coating over the emitter tips.

In another alternative embodiment, relatively high turn-on voltages may be tolerated by use of the gate shield as described above. The gate shield structure avoids "Pull-in" of the conductive gate. It is anticipated that the gate voltage may generally pull the gate towards the silicon substrate ("Pull-in") at gate voltages of 30V and greater. In this embodiment, the gate shield feature is connected to an electrical circuit which biases the gate shield at the gate voltage, thus creating an electric field-free region. This avoids pull-in and thus tolerates higher turn on voltages.

Figure 7:
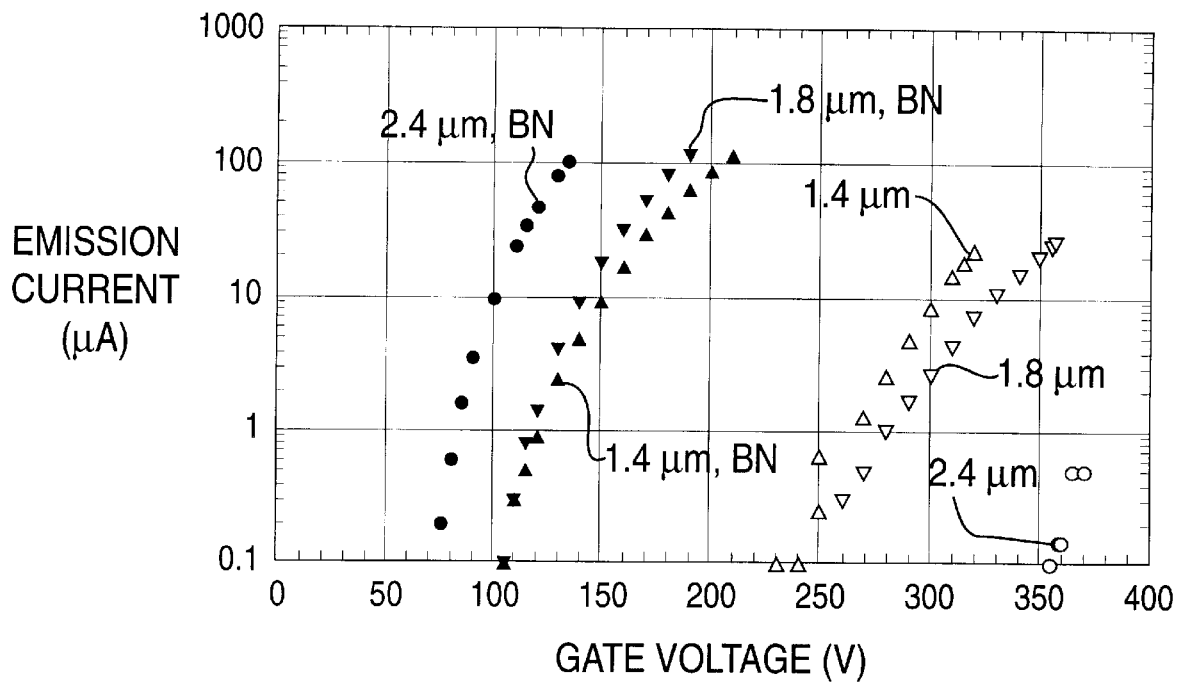
FIG. 7 is a graph of the I–V characteristics of the silicon emitters.

FIG. 7 shows the effect of the BN coating on the emission current of the emitters. FIG. 7 is a graph showing the I–V characteristics of silicon emitters with and without the BN coating. The corresponding dimension represents the diameter of the corresponding hole in the gate plate formed over the single silicon emitter. The silicon emitters are of fixed dimension. It can be seen that the gate voltage which produces a particular current level of electrons emitted from a field emissive device is reduced for the BN-coated emitters relative to the un-coated emitters.

In an exemplary embodiment of the invention using a 2 micron high silicon emitter, the emission current changes by an order of magnitude when the gate is moved with respect to the silicon emitters by about 0.4 microns. Measurements done on an exemplary field emissive device indicate that the degree of deflection of the bi-material micro-cantilever is on the order of 0.05–0.1 microns/degree centigrade. The bending motion of the gate varies depending on the materials used to form the bi-material films, the configuration and dimensions of the micro-cantilever, and depending on the presence or absence of an infrared absorber material within the bi-material structure. It is expected that the noise equivalent temperature (NEΔT) of an exemplary device may be on the order of 50 mK–200 mK.

The width and length of the gate plate affect the degree of bending of the plate in response to a given amount of absorbed infrared radiation. In the exemplary embodiment, the gate plate may include a width of 50 microns and a length of 50 microns, but other gate widths and lengths ranging from 25 to 150 microns, may be used in alternative embodiments, depending on the number, size, and spacing of the emitters formed within the pixel region. The gate plate will be generally rectangular in the various exemplary embodiments. In an exemplary embodiment, the microcantilevered, conductive gate may be suspended by a distance (235 as shown in FIG. 1) of approximately 0.85 micron above the base surface of the emitters. This distance, or spacing is determined by the thickness of the release layer is used. In alternative embodiments, this distance may be varied.

Another aspect of the present invention is to provide an apparatus to compensate for emitter-to-emitter, or field emissive device-to-field emissive device, (hereinafter pixel-to-pixel) non-uniformity, which may result during the fabrication process. Emitter non-uniformity may be corrected by providing multiple emitters within each individual pixel to create a statistical smoothing. Nevertheless, a pixel-to-pixel non-uniformity may still result due to residual emitter non-uniformity and the differences between the thermal behavior of the cantilevered bi-material gate, from pixel-to-pixel. This pixel-to-pixel variation is best corrected at each individual pixel. Each individual field emissive device contains a metal gate plate, and in one exemplary embodiment, a metal gate shield. Within an infrared imager chip containing an array of field emissive devices, all gates are maintained at the same electrical potential and all shields are maintained at the same electrical potential. The gate and field shield are nominally tied to the same potential to both increase the field at the tip of the silicon emitter and to prevent electrostatic pull-in of the gate. However, if a small differential potential is applied between the shield and gate, the relative positions of the gate relative to the tips of silicon emitters, the emitted current can be adjusted to smooth out the offset variation.

This fine-adjustment may be used both for temperature and non-uniformity compensation. For temperature compensation, an equal potential is applied to all pixels to compensate for the movement of the cantilevers due to the ambient temperature. This adjustment may be made automatically in response to an ambient temperature sensor (not shown) or the gate voltage may be manually adjusted until the appropriate background image is observed.

In an exemplary embodiment utilizing non-uniformity correction, a local potential is applied on a pixel-by-pixel basis. This entails the storage of a small corrective potential value for each individual pixel. The uniformity adjustment may be automated. The uniformity adjustment uses equipment comprising a high-quality visible imager, an A/D converter, a computer, measurement automation software (not shown), and D/A converter. The correction circuitry uses a de-multiplexer located on the chip to address the individual pixels. The actual correction potential is applied using a corrective circuit described below and as shown in FIGS. 8A and 8B.

Figure 8A:
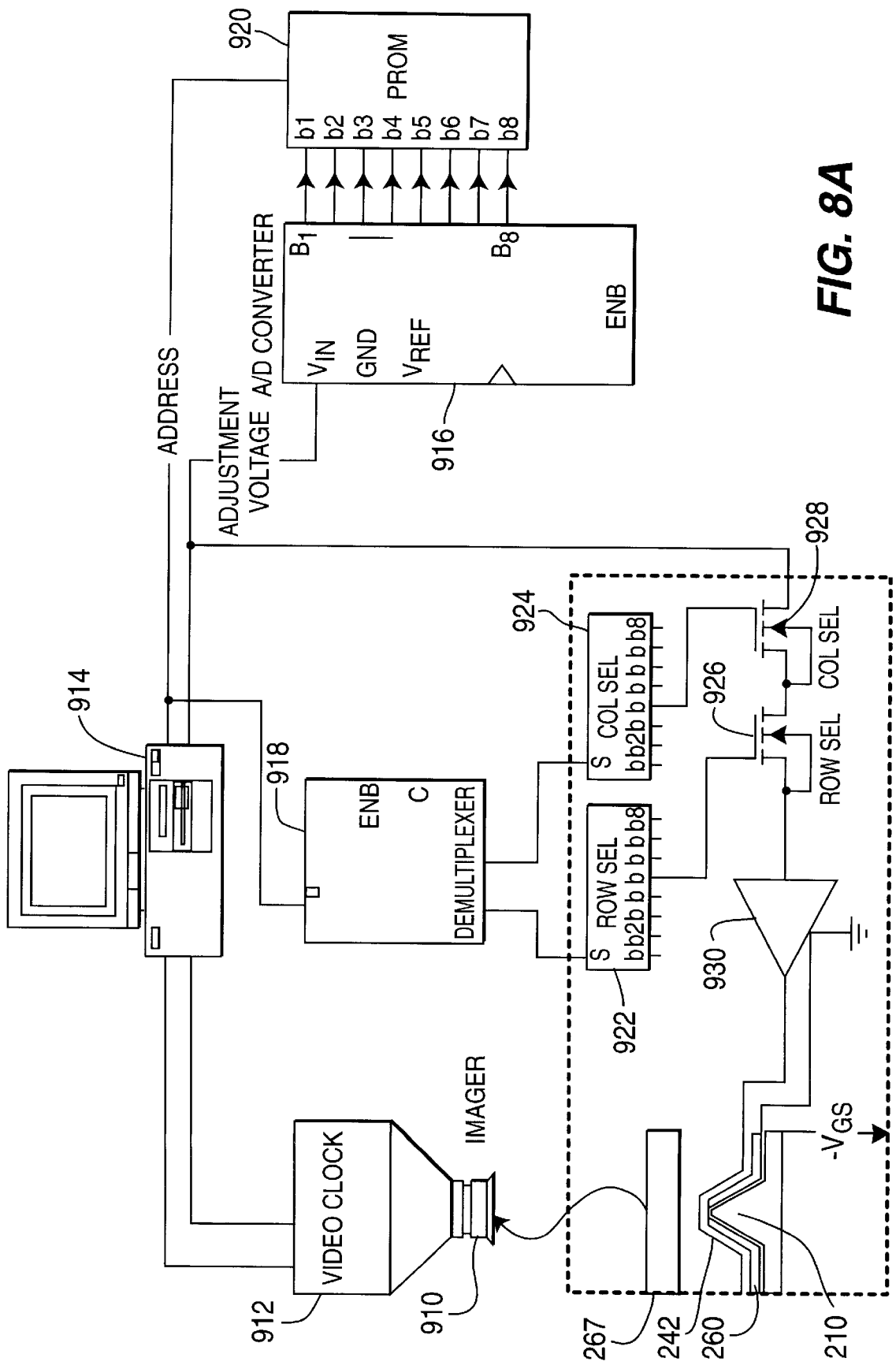
FIG. 8A is a block diagram partly in schematic diagram form showing pixel uniformity correction circuitry.
Figure 8B:
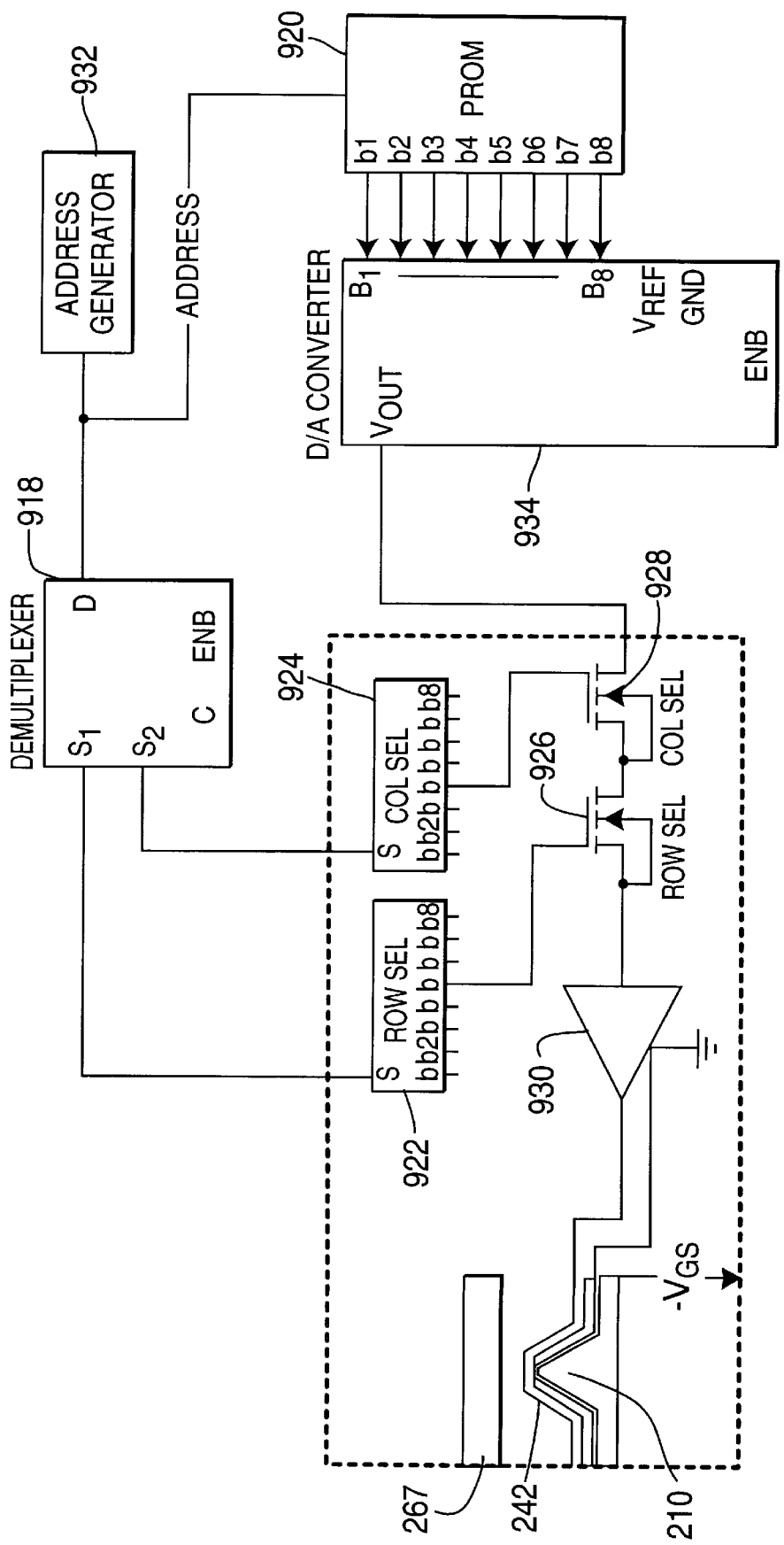
FIG. 8B is a block diagram partly in schematic form showing a refresh circuit which periodically adjusts potentials to ensure calibration.

FIG. 8A is a block diagram, partly in schematic diagram form of a calibration system suitable for use with a MEM field emissive display device according to the present invention. In this Figure, the MEM field emissive display device is represented by the emitter 210, gate plate electrode 242, gate shield electrode 260 and phosphor plate 267. To simplify the drawing Figure, the electrical connections to the emitter 210 and phosphor plate 267 are not shown.

The calibration system operates as follows. As a first step, the MEM field emissive display device is placed in a controlled environment such that the entire array is at a single temperature to within a tolerance of, for example, less than one degree Celsius. Next, a uniform potential is applied between the emitters 210 and the phosphor plate 267 and a uniform potential is applied to both the gate plate electrode 242, and gate shield electrodes 260. This potential is greater than the turn-on potential for the field emitters. In response to these initial conditions, the phosphor plate 267 emits light which is collected by an imager 910 and converted into electrical signals. The imager 910 has sufficient resolution to resolve each image pixel emitted by the phosphor plate. The image signals provided by the imager 910 are converted into a raster-scanned signal by the video clock circuitry 912 and provided to a computer 914. The computer 914, in turn, records an entire image frame as provided by the video clock circuitry 912.

In response to the uniform excitation, each pixel position on the phosphor plate 267 should emit the same amount of light. Due to process variations in the shape of the emitters 210, stiffness of the gate plate electrodes 242, thickness of the insulating layers (not shown) covering the gate shield electrodes 260 and spacing between the gate plate electrodes 242 and the emitters 210, there may be variations in the light emitted by the phosphor plate 267 from pixel position to pixel position. The computer 914 averages the intensity of all of the pixels in the image frame to produce an average pixel intensity value. Next, the computer adjusts the gate to shield potential for each image pixel in order to reduce the intensity of pixels having greater than average intensity and increase the intensity of pixels having less than average intensity.

The gate-to-shield potential is adjusted by applying an analog value to the column driver circuitry 928 for the pixel while selecting the particular image pixel using the row select circuitry 922 and column select circuitry 924. The pixel in the display device has an address value that is provided by the computer 914 to a demultiplexer 918. The demultiplexer 918 splits the single pixel address value into separate row and column address values which are applied to the row select circuitry 922 and column select circuitry 924.

As shown in FIG. 8A, selecting a particular row and column activates two transistors 928 and 926 which provide a path for the analog gate to shield potential, provided by the computer 914, to be applied to a buffer amplifier 930 and then to the gate and shield of the selected pixel. In the exemplary embodiment of the invention, the gate shield electrode 260 is held at the preprogrammed potential and the difference potential is applied to the gate plate electrode 242. This process is repeated in a feedback loop until all image pixels have an intensity which approximates the average intensity to within a predetermined tolerance. Once these values have been determined, they are digitized by the analog to digital converter 916 and stored into the programmable read only memory (PROM) 920 as the correction values for the MEM field emissive display device.

When the display device is operated, the circuitry shown in FIG. 8B is used. As described above, the differential gate to shield potential is used to position the gate plate electrode 242 with respect to the emitter 210. The gate electrode 15 and shield electrode 21 form a capacitor. As is well known, all capacitors exhibit some leakage such that electrical charge stored on the capacitor and thus, the electrical potential across the capacitor eventually decays. The circuitry shown in FIG. 8B acts as a refresh circuit which periodically adjusts the differential potential to ensure that the display device remains calibrated. In addition, the circuitry shown in FIG. 8B may also include a temperature sensor (not shown) and biasing circuitry (not shown) to add a bias potential to the differential potentials that are applied to the individual pixels in order to implement a temperature correction, as described above.

The circuitry shown in FIG. 8B is driven by the address generator 932 which generates successive address values to scan through each image pixel in the display with a period that is much less than the decay period of the capacitor formed by the gate plate electrode 242 and gate shield electrode 260. The address value provided by the generator 932 is applied to the demultiplexer 918 which separates it into a row address and a column address. The row address is, in turn, applied to the row select circuitry 922 while the column address is applied to the column select circuitry 924. These circuits, in turn activate the transistors 926 and 928 which form the conductive path to the buffer amplifier 930, as described above. The address generator 932 also applies the address value to the PROM 920 where it is used to fetch the stored digital compensation value for the selected pixel. This value is applied to a digital to analog converter 934 where it is changed to an analog value that is applied to the buffer amplifier 930 via the transistors 926 and 928. This value refreshes the potential stored on the gate-shield capacitor, maintaining the calibration of the display device.

Figure 9:
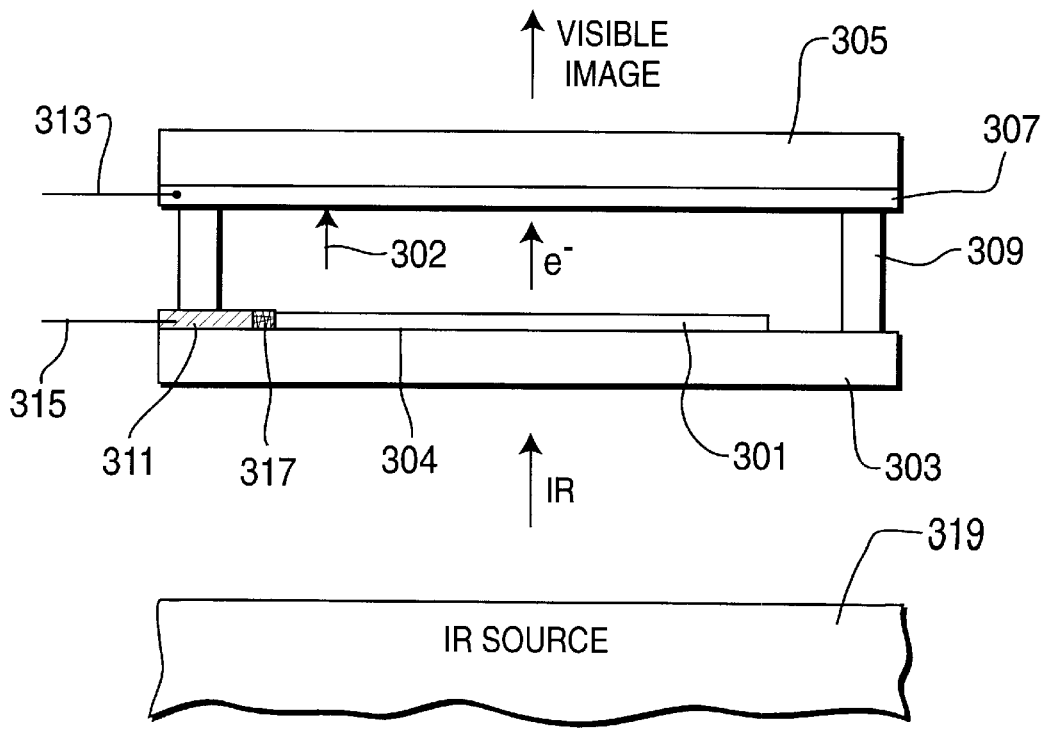
FIG. 9 is a cross-sectional view showing an assembled embodiment of the infrared imager.

FIG. 9 is a cross-sectional view showing the infrared imager of the present invention in assembled form. The assembly includes semiconductor chip 301 which includes the field emissive devices formed according to the process of the present invention. In the exemplary embodiment, the chip size may be approximately 2 centimeters wide and 2 centimeters long but various other chip sizes may be used. Also in the exemplary embodiment, the field emissive devices may be arranged in a 320×240 array. The semiconductor chip 301 is spaced apart by a distance 302 from phosphor plate 307. In the first exemplary embodiment, distance 302 may be 1000 microns. Semiconductor chip 302 is arranged having its bottom surface 304 on infrared transmissive window 303, such as zinc selenide (ZnSe), but other infrared transmissive materials may be used alternatively. In this manner, infrared radiation from infrared radiation source 319 can travel through the transmissive window 303 and reach the IR-transmissive semiconductor chip 301. In an exemplary embodiment, the infrared imager is designed and the infrared transmissive window 303 is chosen to be transmissive to infrared radiation having a wavelength of 8–12 microns. In alternative embodiments, other wavelengths may be used.

In semiconductor chip 301 containing the field emissive devices as described above, the IR radiation is converted to electrons which are emitted from the emitters. The electrons travel to phosphor plate 307 where they are converted to a visible image. Top glass plate 305 allows for easy viewing of the visible image. Circuitry having a potential capable of biasing phosphor plate 307 is applied at connection 313. Conductive pad 311 provides a connection port where connection 315 may be attached. Conductive pad 311 may be electrically connected to semiconductor chip 301 by means of wire bond 317. Circuitry including temperature compensation circuitry (as described above) and pixel-to-pixel uniformity correction circuitry (as described above) may be applied to port 311 through connection 315. Top glass plate 305 and phosphor plate 307 may be connected to bottom glass plate 303 by a vacuum seal 309. It should be understood that alternative arrangements for connecting the chip to power supplies and additional circuitry and for positioning the phosphor plate above the silicon chip containing the field emissive devices, may be used.

The assembled infrared imager as shown in FIG. 9, may be further assembled within a housing (not shown) for use in the field. The infrared imager is arranged within the housing so that the bottom side of the semiconductor chip is positioned to receive incident infrared radiation from the scene desired to be viewed, and also so that the visible image is viewable by the user. In an exemplary embodiment, the housing may be a helmet to be worn on the user's head which includes goggles containing the infrared imager of the present invention. In another exemplary embodiment, the infrared imager may be assembled within a hand-held housing such as a telescope containing an opening to be directed at the scene which is desired to be viewed, infrared lenses to focus an infrared image onto the imager and an opening for viewing the displayed visible image. In alternative embodiments, other housings may be used.

Although illustrated and described herein with reference to certain specific embodiments, the present invention is nevertheless not intended to be limited to the details shown. Rather, various modifications may be made into details within the scope and range of equivalents of the claims and without departing from the spirit of the invention.

What is claimed:

1. A field emissive device formed on a semiconductor substrate having an upper surface and a lower surface and being composed of a substrate material, the field emissive device comprising:
   a plurality of emitters formed within a pixel region of the substrate, each emitter formed substantially of the substrate material, extending vertically from a base surface of the semiconductor substrate, and having a conical shape including a tip oriented upward;
   a deflectable conductive gate disposed above the pixel region and generally parallel to the upper surface, the conductive gate being anchored to the semiconductor substrate and including a bendable bi-material film including a conductive film and a further film,
   wherein the further film and the conductive film have respectively different thermal expansion coefficients.

2. The field emissive device as in claim 1, wherein the conductive gate is anchored to the semiconductor substrate by a thermal isolation support element.

3. The field emissive device as in claim 2, wherein the thermal isolation support element comprises silicon carbide.

4. The field emissive device as in claim 1, wherein the substrate material is transmissive to infrared radiation and the infrared radiation is incident upon the lower surface of the semiconductor substrate.

5. A field emissive device as in claim 1, wherein the deflectable conductive gate further includes an infrared radiation absorber material.

6. The field emissive device as in claim 5, wherein the infrared absorber material is disposed between the conductive film and the further film.

7. The field emissive device as in claim 5, wherein the infrared absorber material comprises TiW.

8. The field emissive device as in claim 1, wherein the further film comprises silicon carbide and the conductive film comprises gold.

9. The field emissive device as in claim 8, wherein the silicon carbide film acts as an infrared absorber material.

10. The field emissive device as in claim 1, wherein the deflectable conductive gate has a plurality of openings extending therethrough, each opening being disposed above a corresponding emitter of the plurality of emitters, and electrons emitted by the plurality of emitters are directed through the openings.

11. The field emissive device as in claim 10, further comprising a phosphor plate generally parallel with the upper surface of the semiconductor substrate and adapted for absorbing the electrons which are directed through the openings in the conductive gate to emit light.

12. The field emissive device as in claim 11, wherein the phosphor plate is connected to circuitry which provides an electrical bias to the phosphor plate which acts to accelerate the electrons which are directed through the openings in the conductive gate toward the phosphor plate.

13. The field emissive device as in claim 11, wherein the phosphor plate is spaced about 1000 microns above the upper surface of the semiconductor substrate.

14. The field emissive device as in claim 11, wherein the phosphor plate and the semiconductor substrate are mounted in a fixed configuration.

15. The field emissive device as in claim 1, wherein the deflectable conductive gate is spaced about 1 micron above the plurality of emitters.

16. The field emissive device as in claim 1, wherein the conductive gate and the plurality of emitters are electrically connected to circuitry which produces an electric field between the plurality of emitters and the gate.

17. The field emissive device as in claim 1, wherein the plurality of emitters comprises 10 to 200 emitters.

18. The field emissive device as in claim 1, wherein the substrate material comprises silicon, and the lower surface of the substrate is coated with an anti-reflective coating.

19. The field emissive device as in claim 1, wherein the conductive gate is generally rectangular and has a width within the range of 25 microns to 150 microns and a length within the range of 25 microns to 150 microns.

20. The field emissive device as in claim 1, further comprising a micro-cantilever arm connecting the conductive gate to the substrate, the arm having a width ranging from 3 microns to 6 microns and a length ranging from 40 microns to 400 microns.

21. The field emissive device as in claim 1, wherein the conductive gate is anchored to the semiconductor substrate by an electrically insulating, thermal isolation support element, and further comprises an interconnect film coupled to the conductive film and extending along the thermal isolation support element over and insulated from the substrate to connect with external circuitry.

22. The field emissive device as in claim 21, wherein the interconnect film comprises TiW.

23. The field emissive device as in claim 1, further comprising an infrared radiation transparent gate shield structure formed on the base surface of the semiconductor substrate between the emitters, the gate shield structure comprising a gate shield film disposed between upper and lower protective layers.

24. The field emissive device as in claim 23, wherein the upper and lower protective layers each comprise silicon carbide.

25. The field emissive device as in claim 23, wherein the gate shield film comprises one of a tin oxide film, an indium tin oxide film, and a doped polycrystalline silicon film.

26. The field emissive device as in claim 1, further comprising a boron nitride film disposed on the plurality of emitters.

27. The field emissive device as in claim 1, wherein the plurality of emitters have an average height within a range of 1 to 3 microns.

28. The field emissive device as in claim 1, further comprising an infrared radiation transparent gate shield structure formed on the base surface of the semiconductor substrate between the emitters, the gate shield structure comprising a gate shield film disposed over a lower protective layer formed of silicon carbide.

29. An infrared imager comprising an array of field emissive devices formed within a semiconductor substrate having an upper surface and composed of a substrate material, each field emissive device comprising:

a plurality of emitters formed within a pixel region of the substrate, each emitter formed primarily of the substrate material, extending vertically from a base surface of the semiconductor substrate having a conical shape and including a tip oriented upward; and a deflectable conductive gate disposed above the pixel region and generally parallel to the upper surface, the conductive gate being anchored to the semiconductor substrate including a bendable bi-material film including a conductive film and a further film, the deflectable conductive gate further comprising a plurality of openings positioned above respective ones of the plurality of emitters.

30. The infrared imager as in claim 29, wherein the conductive gate of each field emissive device includes an infrared radiation absorber material.

31. The infrared imager as in claim 29, wherein the conductive gate of each field emissive device is anchored to the semiconductor substrate by a thermal isolation support element and further comprises an interconnect film coupling each of the conductive gates to each other conductive gate.

32. The infrared imager as in claim 31, wherein the conductive gate of each field emissive device further includes an infrared radiation absorber material, and the interconnect film and the infrared absorber material each comprise TiW.

33. The infrared imager as in claim 29, further comprising a phosphor plate disposed above, and generally parallel to, the upper surface of the substrate, the phosphor sheet being adapted to absorb electrons emitted from emitters of the plurality of emitters for each field emissive device of the array of field emissive devices, to emit light.

34. The infrared imager as in claim 33, wherein the conductive gate of each field emissive device of the array of field emissive devices is electrically connected to circuitry which provides an electric field between the plurality of emitters and the conductive gate, and the phosphor plate is connected to further circuitry which provides an electrical bias to the phosphor plate which electrical bias acts to accelerate the electrons emitted by the field emissive devices toward the phosphor plate.

35. The infrared imager as in claim 29, wherein each field emissive device further comprises an infrared radiation transparent gate shield film structure disposed within the pixel region and on the base surface between the emitters of the plurality of emitters.

36. The infrared imager as in claim 35, further comprising a correction circuit adapted for individually applying an electric potential between the conductive gates and the gate shield film structure for each field emissive device of the array of field emissive devices.

37. The infrared imager as in claim 29, wherein the plurality of emitters of each field emissive device are coated with a boron nitride film.

38. A night vision system, comprising an array of field emissive devices formed within a semiconductor substrate having an upper surface and composed of a substrate material, each field emissive device comprising:

a plurality of emitters formed within a pixel region of the substrate, each emitter formed primarily of the substrate material, extending vertically from a base surface, and having a conical shape including a tip oriented upward; and a deflectable conductive gate disposed above the pixel region and generally parallel to the upper surface, the conductive gate being anchored to the semiconductor substrate by a thermal isolation support element and including an infrared radiation absorber material and a bi-material film, the bi-material film being bendable and including a conductive film, and the deflectable conductive gate having a plurality of openings extending therethrough, each opening disposed above a corresponding emitter of the plurality of emitters, and the conductive gate including an electrical connection film which connects the gate electrically to circuitry which produces an electric field between the plurality of emitters and the conductive gate, and a phosphor plate disposed above, and generally parallel to, the upper surface, the phosphor sheet adapted to absorb electrons emitted by the emitter, and connected to further circuitry which provides an electrical bias to the phosphor plate to accelerate the electrons emitted by the emitter toward the phosphor plate, a housing containing at least the array, the phosphor plate, the circuitry, and the further circuitry, wherein the housing positions the semiconductor substrate so that a bottom surface thereof is oriented for receiving incident infrared radiation, and the substrate material is transmissive to infrared radiation.

39. The night vision system as in claim 38, wherein the housing comprises a hand-held unit.

40. The night vision system as in claim 38, wherein the housing comprises a unit shaped to be worn on a person's head.

41. The night vision system as in claim 38, wherein each field emissive device further comprises an infrared radiation transparent gate shield film structure disposed within the pixel region and on the base surface between the emitters of the plurality of emitters.

42. The night vision system as in claim 41, further comprising a correction circuit adapted for individually applying an electric potential between the conductive gate and the gate shield film structure for each field emissive device of the array of field emissive devices.

43. A method for converting infrared radiation to a visible image comprising:

(a) providing an array of field emissive devices on a semiconductor substrate, each field emissive device including a plurality of emitters s within a pixel region and a deflectable conductive gate disposed above the pixel region, the semiconductor substrate being transparent to infrared radiation, the deflectable gate bending responsive to incident infrared radiation;

(b) providing a phosphor plate disposed above and generally parallel to an upper surface of the semiconductor substrate;

(c) applying an electric potential between the conductive gate and the plurality of emitters to generate a localized electric field; and (d) exposing a bottom surface of the semiconductor substrate to infrared radiation.

44. The method as in claim 43, wherein said step (a) includes the step of providing, in the pixel region of each field emissive device, a gate shield structure formed on a base surface between the emitters.

45. The method as in claim 45, further comprising the step (e) of individually applying an electric potential between the conductive gate and the corresponding gate shield structure for each field emissive device of the array of field emissive devices.

46. The method as in claim 45, further comprising the step of electrically biasing the phosphor plate to accelerate electrons emitted by the field emissive devices towards the phosphor plate.

47. A process for forming an infrared imager within a semiconductor device, comprising the steps of:

(a) providing a semiconductor substrate formed of an infrared transmissive substrate material and having an upper surface and a lower surface;

(b) forming a plurality of emitters in close proximity to one another and defining a pixel region, each emitter formed within the upper surface, substantially of the substrate material, and having a generally conical shape including a tip oriented upward; and (c) forming a deflectable bi-material gate over the pixel region, the bi-material gate being anchored to the substrate, and including a plurality of openings therethrough, each opening superjacent to a respective emitter of the plurality of emitters.

48. The process as in claim 47, wherein step (b) comprises the steps of:

(b1) forming a pattern of a masking material, the pattern including a plurality of generally circular dots arranged in close proximity to one another and defining a pixel region;

(b2) isotropically etching the upper surface of the semiconductor substrate, thereby forming a generally conical emitter beneath each corresponding dot of the plurality of dots, and within the substrate, and a base surface generally parallel to the upper surface and extending between the emitters within the pixel region; and (b3) removing the masking material, and further comprising the step (b4) of oxidizing the substrate in a steam environment to form an oxide film on the substrate, the oxide film forming a release layer over the pixel region.

49. The process as in claim 48, wherein step (b4) comprises the step of thermally oxidizing the substrate.

50. The process as in claim 47, further comprising the step (b1) of oxidizing the substrate in a steam environment to form an oxide film on the substrate, the oxide film including a release layer over the pixel region, and wherein step (c) comprises the steps of:

(c1) forming at least one anchor via extending through the oxide film and providing contact to the substrate;

(c2) forming a thermal isolation material within the anchor via, over the pixel region, and extending between the anchor via and the pixel region, the thermal isolation material forming an anchor within the anchor via and a first bi-material film over the pixel region;

(c3) forming a first plurality of openings through the first bi-material film, each opening being superjacent to an emitter of the plurality of emitters;

(c4) forming a second bi-material film over the pixel region;

(c5) forming a plurality of openings through the second bi-material film over corresponding openings of the first plurality of openings; and (c6) removing the release layer.

51. The process as in claim 50, further comprising the step (c2A) of forming an infrared absorber material over the thermal isolation material, and wherein step (c3) comprises forming a first plurality of holes through the first bi-material film and the infrared absorber material.

52. The process as in claim 51, wherein step (c2A) comprises forming a TiW film over the infrared absorber material.

53. The process as in claim 51, wherein the infrared absorber material is a conductive material and is patterned to serve as an interconnect connecting to the bi-material gate of the imager to external circuitry.

54. A process for forming an array of infrared imagers within a semiconductor device, each infrared imager formed according to the process as in claim 51.

55. The process as in claim 54, wherein the infrared absorber material is a conductive film, and further comprising step (d) of providing electrical connections among the bi-material gates of each infrared imager of the array of infrared imagers.

56. The process as in claim 50, wherein step (c2) comprises the step of forming a silicon carbide film.

57. The process as in claim 50, wherein step (c2) comprises the step of forming a thermal isolation material also serving as an infrared absorber material.

58. The process as in claim 50, wherein step (c4) comprises the step of forming a gold film over the pixel region.

59. The process as in claim 50, further comprising steps of:

(b2) removing the oxide film;

(b3) forming a boron-nitride film on the emitters of the plurality of emitters; and (b4) re-forming an oxide film by means of chemical vapor deposition, the oxide film including a further release layer over the pixel region, and wherein the step of removing the release layer comprises the step of removing the further release layer.

60. The process as in claim 50, further comprising forming an infrared transparent gate shield prior to the step of forming at least one anchor via using a process including steps:

(b2) removing the oxide film:

(b3) forming a base layer on a base surface extending between the emitters of the plurality of emitters defining the pixel region;

(b4) forming a layer of one of tin oxide, indium tin oxide and doped polycrystalline silicon over the base layer; and (b5) forming an oxide film by one of coating and chemical vapor deposition, the oxide film forming a further release layer over the pixel region, and wherein the step of removing the release layer comprises removing the further release layer.

61. The process as in claim 60 further comprising step (b41) forming a cover layer over the layer of one of tin oxide, indium tin oxide, and doped polycrystalline silicon.

62. The process as in claim 61, wherein the steps of forming the base layer and the cover layer each comprise forming a silicon carbide film.

63. The process as in claim 47, further comprising the step (a1) of polishing the lower surface of the semiconductor substrate.

64. The process as in claim 47, further comprising the step (a1) of coating the lower surface of the semiconductor substrate with an anti-reflective coating.

65. The process as in claim 47, further comprising step (d) depositing a boron-nitride film on the emitters of the plurality of emitters.

66. The process as in claim 47, further comprising steps (d) affixing a phosphor plate above and substantially parallel to the upper surface, and (e) coupling a circuit to the substrate, the circuit providing an electric potential between the plurality of emitters and the bi-material gate to generate a localized electric field.

67. The process as in claim 66, further comprising step (f) coupling a further circuit to the substrate, the further circuit providing an electrical bias to the phosphor plate.

68. The process as in claim 47, in which step (b) includes forming a plurality of emitters having an average height within the range of 1–3 microns.

* * * * *